United States Patent
Hardin et al.

(10) Patent No.: US 7,606,254 B1
(45) Date of Patent: Oct. 20, 2009

(54) EVALUATABLE HIGH-ASSURANCE GUARD FOR SECURITY APPLICATIONS

(75) Inventors: David S. Hardin, Cedar Rapids, IA (US); David A. Greve, Cedar Rapids, IA (US); Sung J. Kim, Iowa City, IA (US); Matthew M. Wilding, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 640 days.

(21) Appl. No.: 11/366,136

(22) Filed: Mar. 2, 2006

(51) Int. Cl.
*H04L 12/54* (2006.01)
*H04J 1/16* (2006.01)

(52) U.S. Cl. .................. 370/428; 370/386; 370/412
(58) Field of Classification Search .............. 370/335, 370/386, 412, 428
See application file for complete search history.

(56) References Cited

U.S. PATENT DOCUMENTS

| | | | |
|---|---|---|---|
| 2004/0025016 A1* | 2/2004 | Focke et al. | 713/164 |
| 2005/0198412 A1* | 9/2005 | Pedersen et al. | 710/30 |
| 2006/0075236 A1* | 4/2006 | Marek et al. | 713/171 |
| 2007/0168924 A1* | 7/2007 | Kirby, Jr. | 717/104 |

* cited by examiner

*Primary Examiner*—John Pezzlo
(74) *Attorney, Agent, or Firm*—Daniel M. Barbieri

(57) ABSTRACT

The present invention is a method for providing a high-assurance guard in a partitioned processing system, the partitioned processing system including a first input/output partition, a guard function partition and a second input/output partition, the method including the steps of: receiving a data packet from the first input/output partition of the partitioned processing system via a first I/O interface; determining if the data packet is well-formed as defined by an interface control document; and forwarding the data packet to the second input/output partition of the partitioned processing system and to a second I/O interface only when the data packet is well-formed.

5 Claims, 2 Drawing Sheets

EVALUATABLE HIGH-ASSURANCE GUARD FOR SECURITY APPLICATIONS

FIELD OF THE INVENTION

The present invention relates to the field of computing systems and particularly to an evaluatable high-assurance guard for security applications.

BACKGROUND OF THE INVENTION

High-assurance guards are often necessary for highly secure computer systems. However, in order to receive the desired "high-assurance" or "trusted" certification from government organizations such as the National Computer Security Center (NCSC), such guards must be subjected to an evaluation program (such as the Trusted Products Evaluation Program (TPEP)) in which they are tested against a comprehensive set of security-related criteria. Further, such evaluation typically requires construction and solution of complex mathematical proofs designed to prove the "correctness" of the guard being evaluated. Unfortunately, constructing and solving such proofs can make the evaluation process a complex, time-consuming and expensive undertaking.

Therefore, it may be desirable to have a system and method for providing a high-assurance guard for security applications which addresses the above-referenced problems and limitations of the current solutions.

SUMMARY OF THE INVENTION

Accordingly, an embodiment of the present invention is directed to a method for providing a high-assurance guard in a partitioned processing system, the partitioned processing system including a first input/output partition, a guard function partition and a second input/output partition, the method steps including: receiving a data packet from the first input/output partition of the partitioned processing system via a first input/output (I/O) interface; determining if the data packet is well-formed as defined by an interface control document; and forwarding the data packet to the second input/output partition of the partitioned processing system and to a second I/O interface only when the data packet is well-formed.

A further embodiment of the present invention is directed to a partitioned processing system, including: a first I/O partition; a guard function partition communicatively coupled with the first I/O partition, the guard function partition for receiving a data packet from the first I/O partition and selectively outputting the data packet to the second I/O partition; a second I/O partition communicatively coupled with the guard function partition, wherein the guard function partition outputs the received data packet to the second I/O partition only when the data packet is well-formed as defined by an interface control document.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Figure 1:
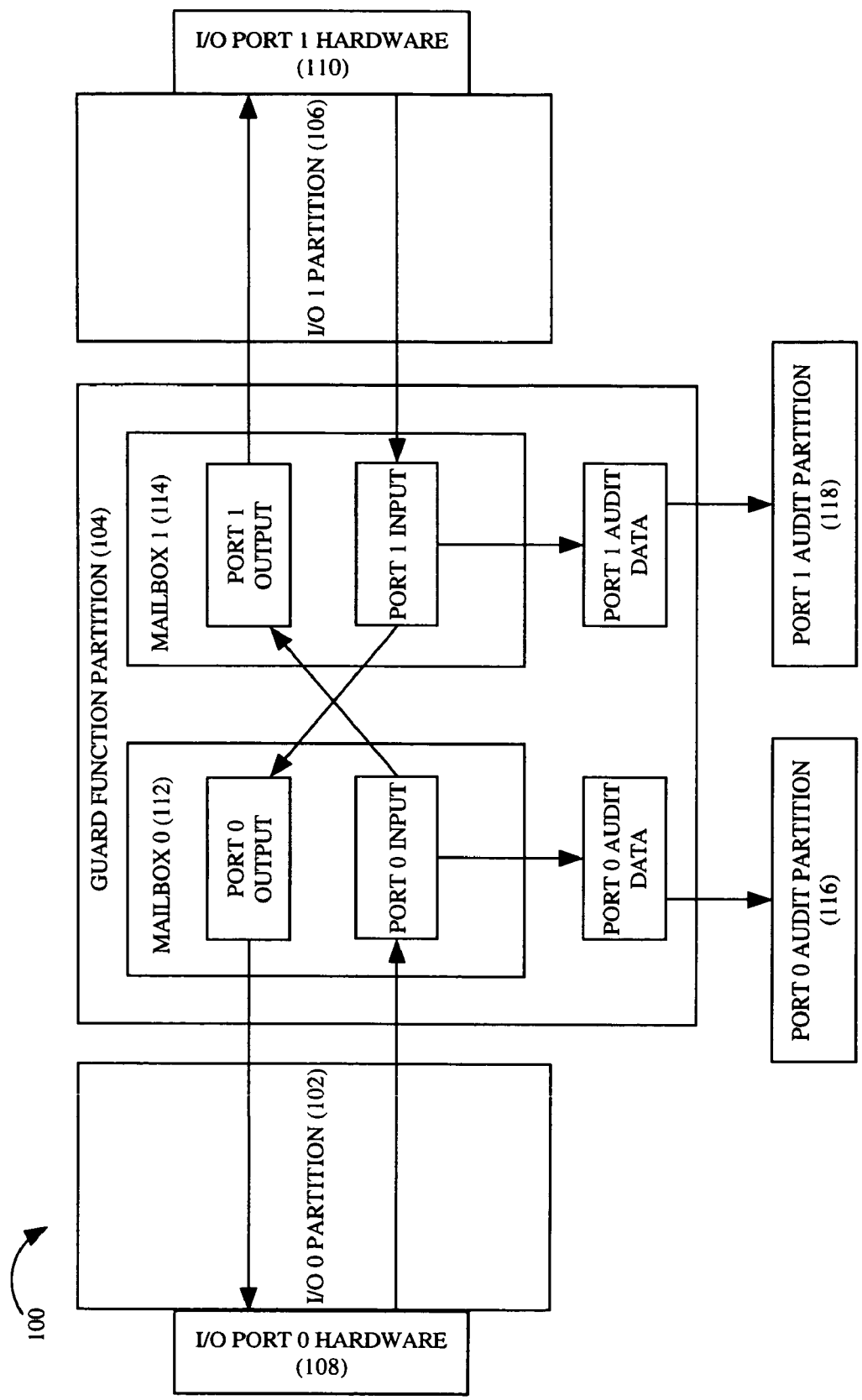
FIG. 1 is a block diagram of a partitioned processing system implementing a high-assurance guard in accordance with an exemplary embodiment of the present invention.

FIG. 1 illustrates a block diagram configuration for a partitioned processing system 100 implementing a high-assurance guard in accordance with an exemplary embodiment of the present invention. Included in the illustrated configuration is a first input/output (I/O) partition 102, a guard function partition 104 and a second input/output (I/O) partition 106. In a present embodiment, the first I/O partition 102 is communicatively coupled with the second I/O partition 106 via the guard function partition 104. In the exemplary embodiment, the first I/O partition 102 and the second I/O partition 106 are configured for handling I/O traffic. Further, I/O port hardware, such as a first I/O port 108 and a second I/O port 110 may be communicatively coupled with the first I/O partition 102 and the second I/O partition 106 respectively. For example, a data packet may be input via the first I/O port 108 and received by the guard function partition 104 via the first I/O partition 102. In current embodiments, the first and second I/O ports (108, 110) may be a variety of ports, such as parallel ports, USB ports or the like. A data packet may be defined as a fundamental unit of information carriage in all modern computer networks that implement packet switching. For instance, the data packet may include a header, which contains information that may be used to forward the data packet from its source to its destination. Further, the data packet may include a data area which contains information about a user who caused the creation of the data packet. Additionally, the data packet may include a trailer which may contain techniques for ensuring that errors do not occur during data transmission.

In the present embodiment, the guard function partition 104 includes a first mailbox 112 for receiving the data packet from the first I/O partition 102. The guard function partition 104 is configured for checking the format of the data packet to determine if the received data packet is well-formed. For example, a data packet may be determined to be well-formed if it is free of packet errors. In the present embodiment, an Interface Control Document (ICD) or similar documentation, defines what constitutes a well-formed data packet. The ICD may describe the format of commands that may be issued over an interface using some lower level protocol (e.g., the RS-232 protocol), as well as describing the format of responses that should be received. For instance, if a data packet received by the guard function partition 104 includes a correct length in bytes, has sub-fields that are of the right format, etc., then the data packet may be determined by the guard function partition to be well-formed. It is further contemplated that interface control information may be implemented via various forms of documentation, such as via an I/O Format Description Document, comments in driver source code, or the like. In the exemplary embodiment, when the data packet received by the guard function partition 104 is well-formed, it is forwarded via a second mailbox 114 (of the guard function partition 104) to the second I/O partition 106, where it may be output via the second I/O port 110. Further, when the data packet received by the guard function partition 104 is not well formed, it is not forwarded to the second I/O partition 106. In this manner, the guard function partition 104 is configured to provide guard functionality for selectively allowing interprocess communication between the first I/O partition 102 and the second I/O partition 106 in accordance with defined communication parameters/policy of the partitioned processing system 100

Each mailbox (112, 114) may include a mutual exclusion synchronization mechanism, such as a binary semaphore, for controlling access to the mailbox. A semaphore may be defined as a hardware or software flag. Further, in multitasking systems, a semaphore may be a variable with a value that indicates the status of a common resource. The semaphore may be used to lock the resource that is being used. For instance, a process needing the resource may check the semaphore to determine the resource's status and then decide how to proceed. Further, each mailbox (112, 114) may include one writer (producer) and one reader (consumer). Additionally, memory regions utilized by the mailboxes and semaphores may be allocated at link time.

As shown in the illustrated embodiment, the guard function partition 104 of the present invention may be subpartitioned to include a first subpartition, responsible for guarding data being directed from the first I/O partition 102 to the second I/O partition 106, and a second subpartition, responsible for guarding data being directed from the second I/O partition 106 to the first I/O partition 102.

Additionally, a first audit partition 116 and a second audit partition 118 may be communicatively coupled with the guard function partition 104 for receiving audit data corresponding to data received by the guard function partition from the first I/O partition 102 and the second I/O partition 106 respectively. Audit data may be defined as system-generated data which corresponds directly to recorded actions taken by identifiable and authenticated users, associated under a unique audit identifier (audit ID). It should be further noted that, in further embodiments, the first and second audit partitions (116, 118) illustrated in FIG. 1 may be combined into a single system-wide audit partition.

In current embodiments, the first I/O partition 102, the guard function partition 104, the second I/O partition 106, the first audit partition 116 and the second audit partition 118 may be partitions of an AAMP7 (Advanced Architecture Micro Processor Model 7) microprocessor. When an AAMP7 microprocessor is implemented, the partition manager of the AAMP7 ensures that only one partition of the partitioned processing system is active at any one time. Further, the partition manager of the AAMP7 includes partition access rights defined so that physical memory allocated to the mailboxes and the semaphores may only be read and/or written by a partition included in the group consisting of: the first I/O partition 102; the guard function partition 104; the second I/O partition 106; the first audit partition 116; and the second audit partition 118. The AAMP7 partitioned processing system further ensures that no application software may alter the system's partitioning data structures. Additionally, access to the semaphores may be limited to a partition included in the group consisting of: the first I/O partition 102; the guard function partition 104; the second I/O partition 106; the first audit partition 116; and the second audit partition 118.

Figure 2:
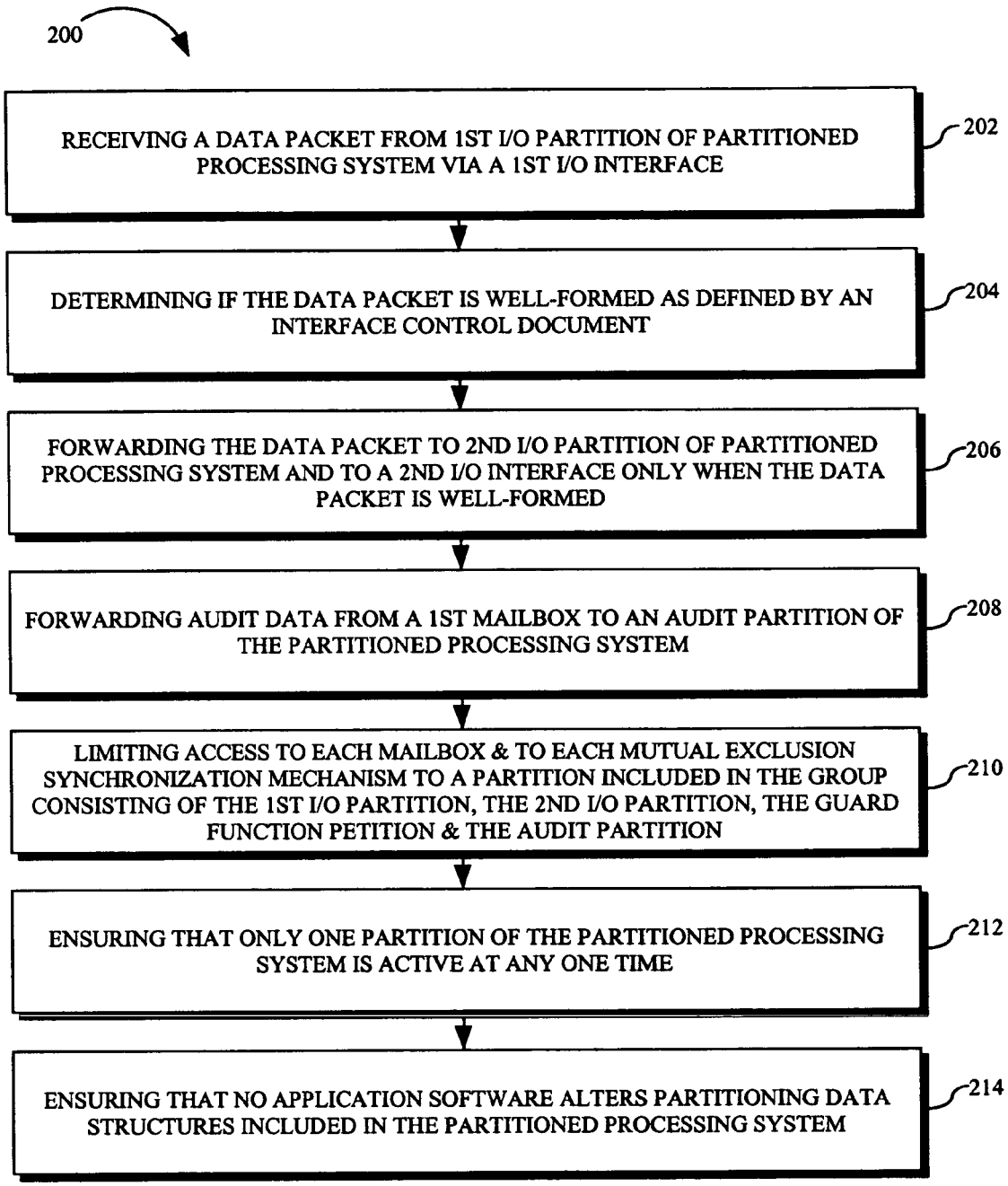
FIG. 2 is a flow chart illustrating a method for providing a high-assurance guard in a partitioned processing system in accordance with an exemplary embodiment of the present invention.

FIG. 2 is a flow chart illustrating a method for providing a high-assurance guard in a partitioned processing system, the partitioned processing system including a first I/O partition, a guard function partition and a second I/O partition, in accordance with an exemplary embodiment of the present invention. The method 200 includes receiving a data packet from a first I/O interface via the first I/O partition of the partitioned processing system 202. For instance, in the present embodiment, the data packet is received in a first mailbox 112. The method 200 further includes determining if the data packet is well-formed as defined by an interface control document 204. The method 200 further includes forwarding the data packet to the second I/O partition of the partitioned processing system and to a second I/O interface 206 only when the data packet is well-formed. For example, in the exemplary embodiment, the data packet is forwarded to the second I/O partition via a second mailbox 114. In the exemplary embodiment, the first and second mailboxes each include a mutual exclusion synchronization mechanism, such as a binary semaphore, for controlling access to the mailboxes. The method 200 further includes forwarding audit data from the first mailbox to an audit partition of the partitioned processing system 208. The method 200 further includes limiting access to each mailbox and to each mutual exclusion synchronization mechanism to a partition included in the group consisting of: the first I/O partition; the second I/O partition; the guard function partition; and the audit partition 210. The method 200 further includes ensuring that only one partition of the partitioned processing system is active at any one time 212. For instance, in current embodiments, the partition manager of an AAMP7 microprocessor may ensure that only one partition of the partitioned processing system is active at any one time. The method 200 further includes ensuring that no application software alters partitioning data structures included in the partitioned processing system 214.

It is to be noted that the foregoing described embodiments according to the present invention may be conveniently implemented using conventional general purpose digital computers programmed according to the teachings of the present specification, as will be apparent to those skilled in the computer art. Appropriate software coding may readily be prepared by skilled programmers based on the teachings of the present disclosure, as will be apparent to those skilled in the software art.

It is to be understood that the present invention may be conveniently implemented in forms of a software package. Such a software package may be a computer program product which employs a computer-readable storage medium including stored computer code which is used to program a computer to perform the disclosed function and process of the present invention. The computer-readable medium may include, but is not limited to, any type of conventional floppy disk, optical disk, CD-ROM, magnetic disk, hard disk drive, magneto-optical disk, ROM, RAM, EPROM, EEPROM, magnetic or optical card, or any other suitable media for storing electronic instructions.

In embodiments in which the above-described guard functionality is implemented as a software package for execution upon an AAMP7 microprocessor, ease of evaluation of the guard software is promoted. For example, the guard software may be divided across the first I/O partition, the second I/O partition, the guard function partition, the first audit partition and the second audit partition of the AAMP7 microprocessor. The AAMP7 microprocessor has an intrinsic partitioning mechanism for ensuring that processes running in different partitions are segregated from one another. During previous evaluations to attain high-assurance certification, this intrinsic partitioning mechanism has been mathematically proven to be correct. When implementing the guard software with the AAMP7 as described above, the assumption can safely be made, for instance, that the critical "guard function" (i.e., format checking) code, executing in the guard function partition 104, will be isolated from non-critical I/O code executing in I/O partitions (102, 106). This reduces the amount of software which needs to be evaluated to a high Evaluation Assurance Level (EAL) to only that portion of the software executing within the guard function partition (i.e., that portion of the software which contains the format checking code). Further, the very nature of the AAMP7's partitioning architecture (i.e., single address space, base-and-bounds memory protection, low-latency partition switching) allows the amount of critical "guard function" code to be small, since it is unburdened by complex interprocess communications software that may be found in operating systems for general-purpose microprocessors. Proofs of correctness may proceed from a symbolic simulation of the critical "guard function" code of the present invention by utilizing a formal model of the AAMP7's instruction set processing. An automated theorem prover, such as an ACL2 (A Computational Logic for Applicative Common LISP (List Processing)), may then be used to perform detailed proof steps for establishing correctness of the guard software. Each of the above-referenced factors may promote ease of evaluation when trying to attain high-assurance certification of the guard software of the present invention by reducing the time and effort needed for evaluation.

It is understood that the specific order or hierarchy of steps in the foregoing disclosed methods are examples of exemplary approaches. Based upon design preferences, it is understood that the specific order or hierarchy of steps in the method can be rearranged while remaining within the scope of the present invention. The accompanying method claims present elements of the various steps in a sample order, and are not meant to be limited to the specific order or hierarchy presented.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A method for providing a high-assurance guard in a partitioned processing system, the partitioned processing system including a first input/output partition, a guard function partition and a second input/output partition, comprising:

receiving a data packet from the first input/output partition of the partitioned processing system via a first I/O interface, wherein the data packet is received by a first inter-partition communication mediator component;

determining if the data packet is well-formed as defined by an interface control document;

forwarding the data packet to the second input/output partition of the partitioned processing system and to a second I/O interface only when the data packet is well-formed, wherein the data packet is forwarded to the second input/output partition from a second inter-partition communication mediator component;

forwarding audit data from the first inter-partition communication mediator component to an audit partition of the partitioned processing system, wherein access to each inter-partition communication mediator component is controlled by a mutual exclusion synchronization mechanism;

limiting access to each inter-partition communication mediator component and to each mutual exclusion synchronization mechanism to a partition included in the group consisting of the first input/output partition, the second input/output partition, the guard function partition and the audit partition; and ensuring that only one partition of the partitioned processing system is active at any one time.

2. A method as claimed in claim 1, further comprising:

ensuring that no application software alters partitioning data structures included in the partitioned processing system.

3. A computer-readable medium having computer-executable instructions for performing a method for providing a high-assurance guard in a partitioned processing system, the partitioned processing system including a first input/output partition, a guard function partition and a second input/output partition, said method comprising:

receiving a data packet from the first input/output partition of the partitioned processing system via a first I/O interface, wherein the data Packet is received by a first inter-partition communication mediator component;

determining if the data packet is well-formed as defined by an interface control document;

forwarding the data packet to the second input/output partition of the partitioned processing system and to a second I/O interface only when the data packet is well-formed, wherein the data packet is forwarded to the second input/output partition from a second inter-partition communication mediator component;

forwarding audit data from the first inter-partition communication mediator component to an audit partition of the partitioned processing system, wherein access to each inter-partition communication mediator component is controlled by a mutual exclusion synchronization mechanism;

limiting access to each inter-partition communication mediator component and each mutual exclusion synchronization mechanism to a partition included in the group consisting of the first input/output partition, the second input/output partition, the guard function partition and the audit partition; and ensuring that only one partition of the partitioned processing system is active at any one time.

4. A computer-readable medium having computer-executable instructions for performing a method for providing a high-assurance guard as claimed in claim 3, the method further comprising:

ensuring that no application software alters partitioning data structures included in the partitioned processing system.

5. A computer-readable medium as claimed in claim 4, wherein the computer-readable medium is evaluatable for correctness using an automated theorem prover.

* * * * *